United States Patent [19]

Norris

[11] 4,286,853

[45] Sep. 1, 1981

[54] MICROFICHE CAMERA HAVING MOTOR CONTROL SYSTEM

[75] Inventor: Philip R. Norris, North Reading, Mass.

[73] Assignee: Polaroid Corporation, Cambridge, Mass.

[21] Appl. No.: 136,933

[22] Filed: Apr. 3, 1980

[51] Int. Cl.³ .............................................. G03B 1/00
[52] U.S. Cl. ...................................... 354/123; 355/54
[58] Field of Search ...................... 354/120, 123, 124; 355/27, 54

[56] References Cited

U.S. PATENT DOCUMENTS

| | | | |
|---|---|---|---|
| 620,036 | 2/1899 | Jenkins | |
| 3,503,317 | 3/1970 | Johnson | |
| 3,667,364 | 6/1972 | Mann | 354/123 |
| 4,027,315 | 5/1977 | Barney | 354/123 |
| 4,068,244 | 1/1978 | Douglas | 354/85 |
| 4,134,675 | 1/1979 | Oosake et al. | 354/124 |
| 4,140,381 | 2/1979 | Douglas | 354/123 |
| 4,174,895 | 11/1979 | Fermaglich et al. | 354/123 |
| 4,235,543 | 11/1980 | Norris | 354/123 |
| 4,235,545 | 11/1980 | Norris | 354/123 |

*Primary Examiner*—Russell E. Adams
*Attorney, Agent, or Firm*—John S. Vale

[57] ABSTRACT

A self-developing microfiche camera for exposing a plurality of micro-image areas arranged in rows and columns on a single card-like film unit. The camera includes a system for controlling operation of an electrical motor in an exposure cycle mode during which the motor drives a barrel cam through a rotational increment to operate the shutter and index the objective lens, and in a reset cycle mode during which the motor advances the barrel cam through as many rotational increments as necessary to return the lens and barrel cam to a predetermined starting position. A shutter latching device is provided to disenable shutter operation during each reset cycle.

14 Claims, 15 Drawing Figures

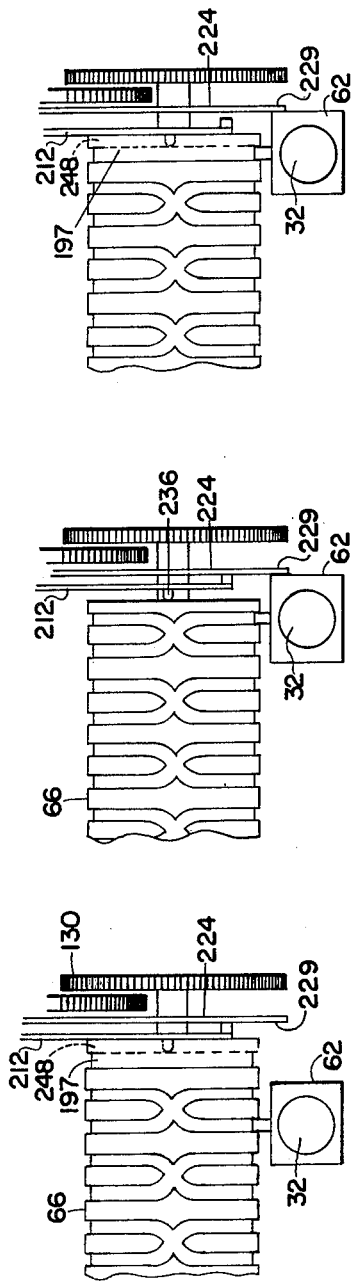
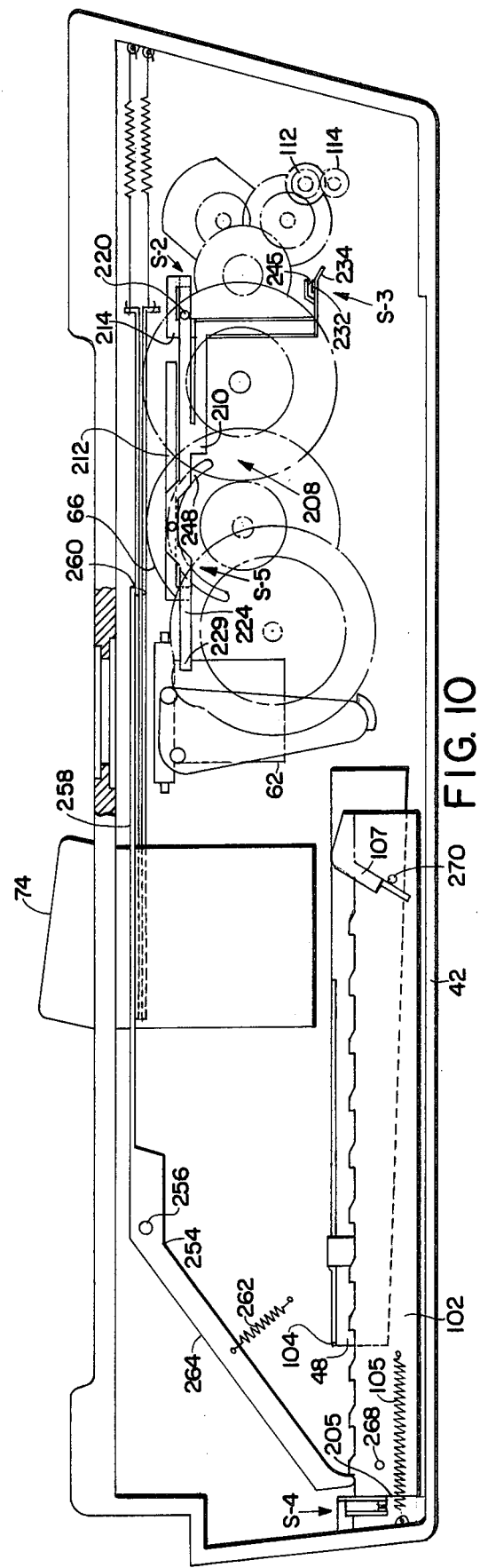

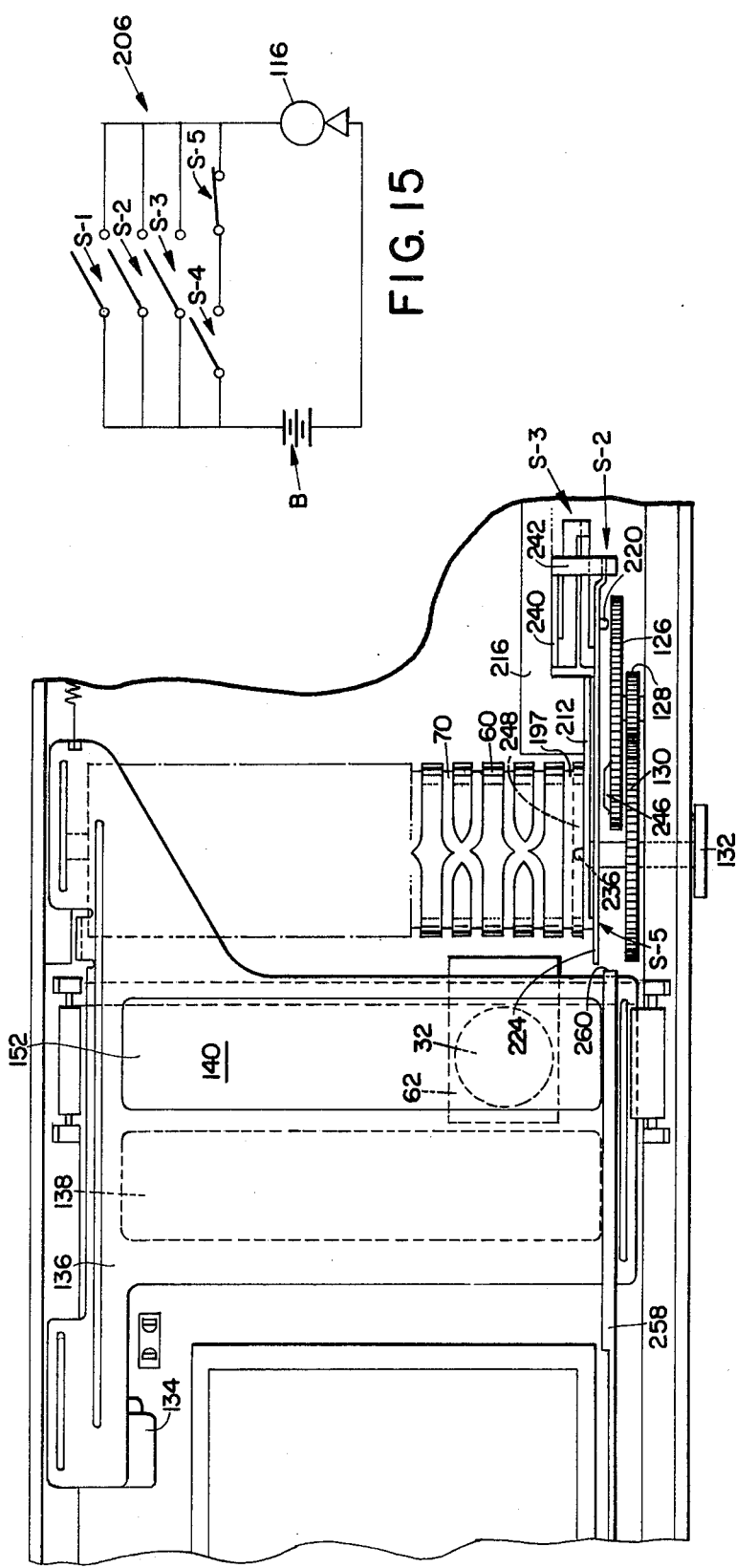

MICROFICHE CAMERA HAVING MOTOR CONTROL SYSTEM

BACKGROUND OF THE INVENTION

The present invention relates to the field of photography and, more particularly, to a camera, usable in a microfiche system, for recording a plurality of images on a single card-like film unit, preferably of the self-developing type.

Commonly-assigned copending application, U.S. Ser. No. 098,492, filed by P. R. Norris on Nov. 29, 1979, discloses a microfiche camera of the type including a plate having a plurality of gate apertures therein for defining a laterally extending row of image areas on a portion of a film unit supported for longitudinal movement along a film plane and an objective lens mounted on a carriage for incremental movement in linear passes along the row during which the lens is successively located in imaging relation with each of the image areas. A barrel cam, advanceable in predetermined rotational increments, incrementally moves the lens in one direction from a starting position to a terminal position during one linear pass and then moves the lens in the opposite direction back to the starting position during the next linear pass. The camera also includes a system, including a shutter, for controlling exposure; structure on the barrel cam for normally operating the shutter each time the barrel cam is advanced through one of its rotational increments; a film advancing system for incrementally advancing the film unit longitudinally after each linear pass to present the next portion of the film unit in registration with the image area defining apertures; and a drive system, including an energizable electrical motor, for rotatably driving the barrel cam. In a preferred embodiment, the camera utilizes a self-developing film unit and includes a pair of processing rollers configured to be driven by the motor for processing the film unit following exposure. Also, the camera includes a self-contained strobe flash unit for illuminating documents to be photographed. The strobe unit is designed to be fired automatically in response to shutter operation.

Normally, the camera is operated in a succession of single frame exposure cycles until all of the image areas on the film unit are exposed. The camera then is actuated one more time which causes the film to be advanced into the rollers for processing. The completion of the processing cycle results in the lens and barrel cam being automatically repositioned at a predetermined starting position in preparation for initiating exposure of the next film unit.

Sometimes, however, it is desirable to process the film unit before all of the image areas thereon have been exposed. Typically, the film unit may include 49 image areas all of which are not required to record a group of related documents. Accordingly, a pick slide member forming part of the film advancing system may be advanced manually after the completion of any exposure cycle to initiate the film processing cycle. When this occurs, it is most likely that the lens and the barrel cam will not be in their proper starting positions to expose the first image area on the next film unit.

Therefore, it is desirable to provide such a camera with a motor control system that not only operates in exposure cycle and processing cycle modes, but additionally operates the camera in a reset cycle mode for resetting the lens and barrel cam back to their respective starting positions. Also, it is preferable that the shutter and strobe unit not operate during such a reset cycle to prevent extraneous light from entering the camera and possibly fogging the next film unit and for reducing wear and tear on the shutter mechanism and strobe unit.

Commonly-assigned copending application, U.S. Ser. No. 072,051, now U.S. Pat. No. 4,235,543 discloses a microfiche camera having a control system which operates in a reset cycle mode. However, this system is mechanically complex in that it uses a motor driven reset pawl to drive a reset ratchet wheel coupled to the barrel cam. This feature is also disclosed in commonly-assigned copending applications Ser. Nos. 071,939; 071,940; and 088,766.

Commonly-assigned copending application U.S. Ser. No. 047,057 discloses a hand viewer for card movies in which a pivoting lens mounting boom is reciprocally driven by an electrical motor for scanning successive rows of images on a film unit. The viewer includes a control system which operates a motor in a reset cycle mode and includes a cam for opening an electrical switch when the boom has returned to the starting position for deenergizing the motor to end the reset cycle. The control system uses a separate cam that is keyed to the rotation of the barrel cam for opening the switch. However, the barrel cam in that application is adapted to be driven on a continuous basis rather than in precise rotational increments required for proper operation of a microfiche camera.

Commonly-assigned copending applications, U.S. Ser. Nos. 047,024 and 047,115, disclose a card motion picture camera having a motor control circuit for operating a first motor for driving the barrel cam and a second motor for driving the film processing rollers. Such a control system utilizes multi-pole switching arrangements and tends to be overly complex and too expensive for use in a microfiche camera.

Therefore, it is an object of the present invention to provide a microfiche camera having a motor control system which is simple in its construction and accurate in its operation.

It is another object of the invention to provide a microfiche camera having a motor control system which utilizes a minimum number of switches and operates in exposure cycle, processing cycle, and reset cycle modes of operation.

Another object of the invention is to provide a microfiche camera having structure for automatically disenabling shutter and strobe operation during a reset cycle and for enabling such operation during an exposure cycle.

Other objects of the invention will, in part, be obvious and will, in part, appear hereinafter.

SUMMARY OF THE INVENTION

The present invention provides a camera, suitable for use in a microfiche system, for exposing a plurality of image areas on a single card-like film unit. The microfiche camera is of the type previously described wherein the shutter is operated and the lens is incrementally moved by a barrel cam which is advanceable in predetermined rotational increments by a drive system which includes an energizable motor.

In a preferred embodiment, the camera includes a motor control system being operable in an exposure cycle mode to effect advancement of the barrel cam through one rotational increment, and in a reset mode to continuously advance the barrel cam to return the lens to the starting position; and structure for disenabling operation of the shutter by the shutter operating structure on the barrel cam during each reset cycle and for enabling such shutter operation during each exposure cycle.

The structure for disenabling and enabling shutter operation includes a pivoting latch lever which is movable into a shutter blade latching position in response to initiating the reset cycle. In the illustrated embodiment, the control system is actuated to initiate a reset cycle by the movement of a film advancing pick slide member back to its initial position. Just before the slide member reaches its initial position it engages and pivots the shutter blade latching lever from an unlatching position to a latching position. When the pick slide member is moved from its initial position to locate a film unit at the exposure position, it becomes disengaged from the shutter latch lever which then automatically moves from the latching position to the unlatching position under the influence of a lever biasing spring. Disenabling operation of the shutter automatically disenables operation of the strobe flash unit which is actuated in response to movement of one of the shutter blades.

In a preferred embodiment, the motor control system includes a motor control circuit for controlling operation of the motor in both an exposure cycle and a reset cycle mode. The circuit includes a first switching arrangement operable for energizing the motor to effect advancement of the barrel cam through one rotational increment and a second switching arrangement operable in the reset cycle mode for energizing the motor to continuously advance the barrel cam through as many rotational increments as necessary to return the lens to the starting position and for transferring control of the motor to the first switching arrangement as the barrel cam is advanced through the last necessary rotational increment so that the first switching arrangement automatically deenergizes the motor to terminate barrel cam advancement at the end of the last rotational increment.

The second switching arrangement includes a normally closed switch which is responsive to both the position of the lens and the angular disposition of the barrel cam so that it opens when the lens and barrel cam are both in their predetermined starting positions thereby transferring control of the motor to the first switching arrangement to terminate the reset cycle.

BRIEF DESCRIPTION OF THE DRAWINGS

For a fuller understanding of the nature and objects of the invention, reference should be had to the following detailed description taken in connection with the accompanying drawings wherein:

FIG. 10 is similar in some respects to FIG. 6 but shows the switching assembly in its operative position and also shows the shutter latch in its latching position;

FIG. 11 is a plan view of the switching assembly and a portion of the shutter latch;

FIGS. 12, 13 and 14 are diagrammatic views showing how one of the switches in the motor control system interacts with the barrel cam and the lens carriage; and FIG. 15 is a circuit diagram of the motor control system.

DESCRIPTION OF THE PREFERRED EMBODIMENT

Figure 1:
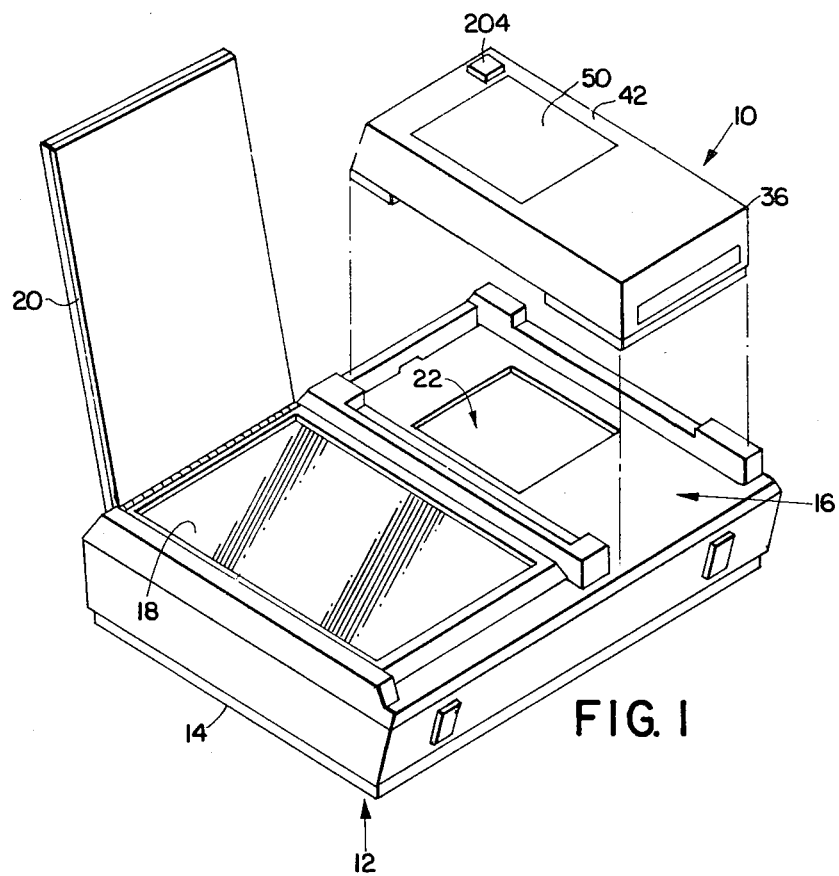
FIG. 1 is an exploded perspective view of a microfiche camera, embodying the present invention, and a console for receiving the camera in position to copy a document supported on the console.
Figure 2:
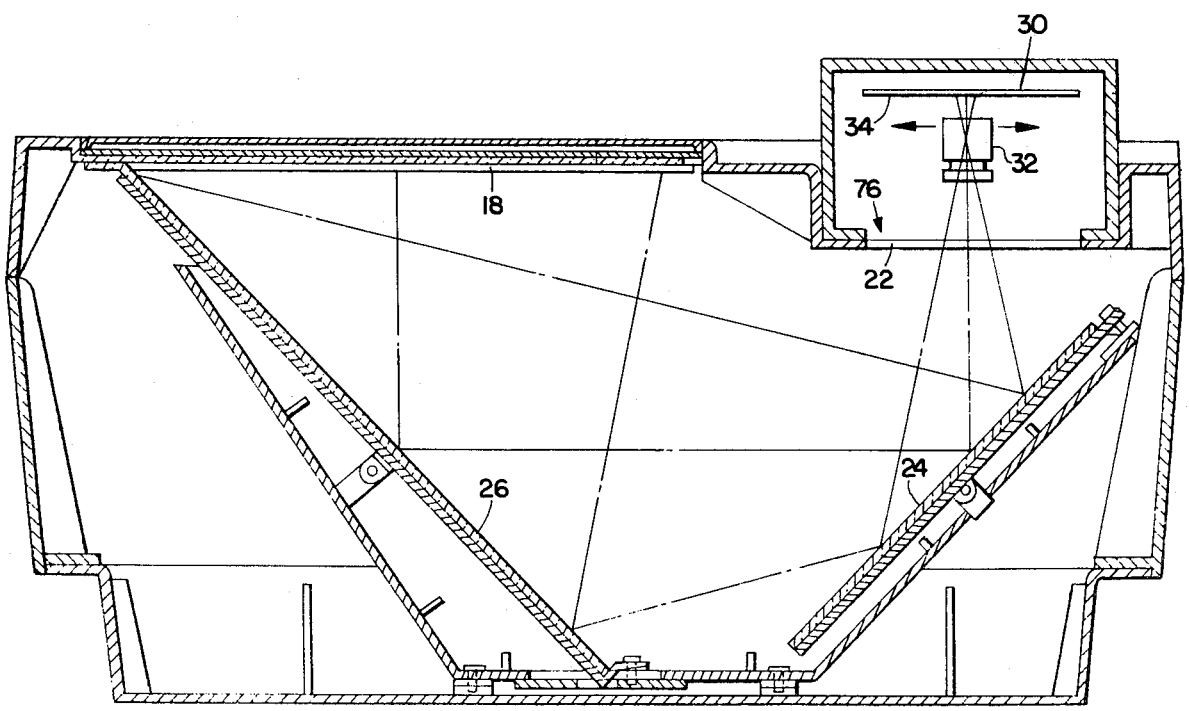
FIG. 2 is a cross-sectional view showing the camera mounted at its operative position on the console.

FIGS. 1 and 2 show two components of a microfiche recording and viewing system which includes a scanning microfiche camera 10, illustrating a photographic apparatus embodying the present invention, and a console 12 for releasably receiving camera 10.

Console 12 includes a box-like housing 14 having on its upper surface a camera/projector mount 16 and an adjacent document mounting area defined by a document supporting glass 18 and a hinged cover 20.

Mount 16 is a well-like structure for releasably receiving the forward portion of camera 10 and includes a light transmission aperture 22 that is aligned with a later-to-be-described camera lens and strobe lighting unit when camera 10 is operatively located on mount 16.

The console 12 further includes reflective means in the form of a pair of internally mounted angled mirrors 24 and 26 which define a folded optical path for the transmission of image forming light between the document mounting area and aperture 22.

Figure 5:
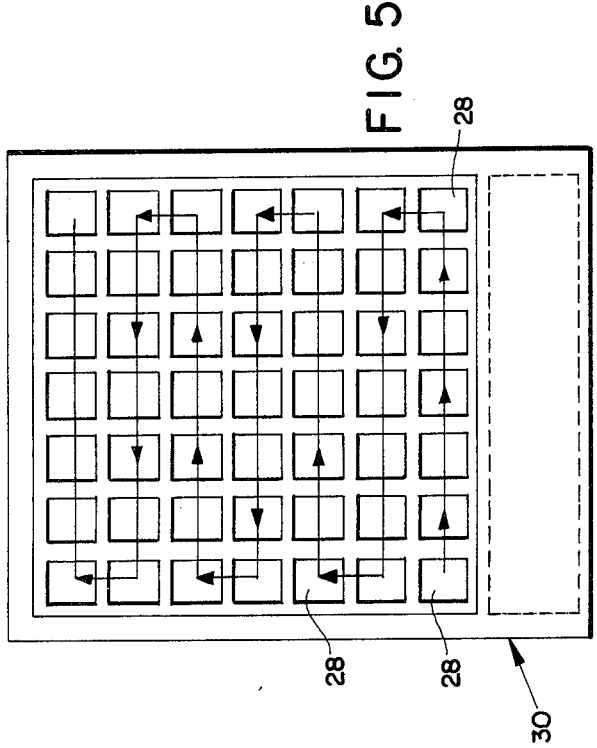
FIG. 5 is a plan view of a self-developing film unit diagrammatically showing a plurality of image areas thereon and the order in which these image areas are exposed sequentially.

As most clearly shown in FIG. 5, camera 10 is configured to expose a plurality of micro image areas 28 arranged orthogonally in linear columns and rows on a single card-like film unit 30 which is preferably of the integral self-developing transparency type described in commonly-assigned U.S. Pat. No. 3,721,562.

In order for camera 10 to expose the image areas 28, in the sequence shown by the arrows in FIG. 5, the camera objective lens 32 is mounted for lateral movement in steps relative to the film plane 34, in response to each actuation of camera 10, to expose a row of image areas 28 with latent images of successive documents supported on glass 18. After the last exposure in the lateral row, a later-to-be-described film advancing mechanism advances film unit 30, longitudinally, one row position and then lens 32 is advanced in the opposite direction to expose the next row of image areas 28. After the last image area 28 is exposed, the film unit 30 is advanced between a pair of later-to-be-described pressure applying rollers for processing in a well-known manner.

After film processing, the microfiche system may be converted from its image recording mode to a viewing mode by removing camera 10 from mount 16 and replacing it with a projector (not shown). The projector includes a self-contained light source and projects an enlarged image of a micro image frame area onto a translucent viewing screen (not shown) placed over glass 18.

For a more detailed description of the microfiche system, reference may be had to the previously-noted commonly-assigned copening applications U.S. Ser. Nos. 071,939; 071,940; 072,051; 088,766 and 098,492, all of which are incorporated by reference herein.

While the present invention is directed to a motor control system for operating camera 10 in exposure cycle, processing cycle and reset cycle modes of operation and a shutter latching system for disenabling shutter operation during the reset cycle, other portions of camera 10 must be described briefly to present the necessary background for understanding the present invention.

With reference to FIGS. 1, 3, 4, 6 and 10, the camera 10 includes a generally box-like housing 36 defined by a hollow base section 38 and a forward wall housing section 40 closing the open top of base section 38.

For ease of illustration the camera 10 is shown in FIGS. 3, 4, 6 and 10 with base section 38 at the bottom. However, it will be understood that camera 10 is mounted on console 12 with its forward wall 40 facing the mount 16 as shown in FIGS. 1 and 2.

Figure 3:
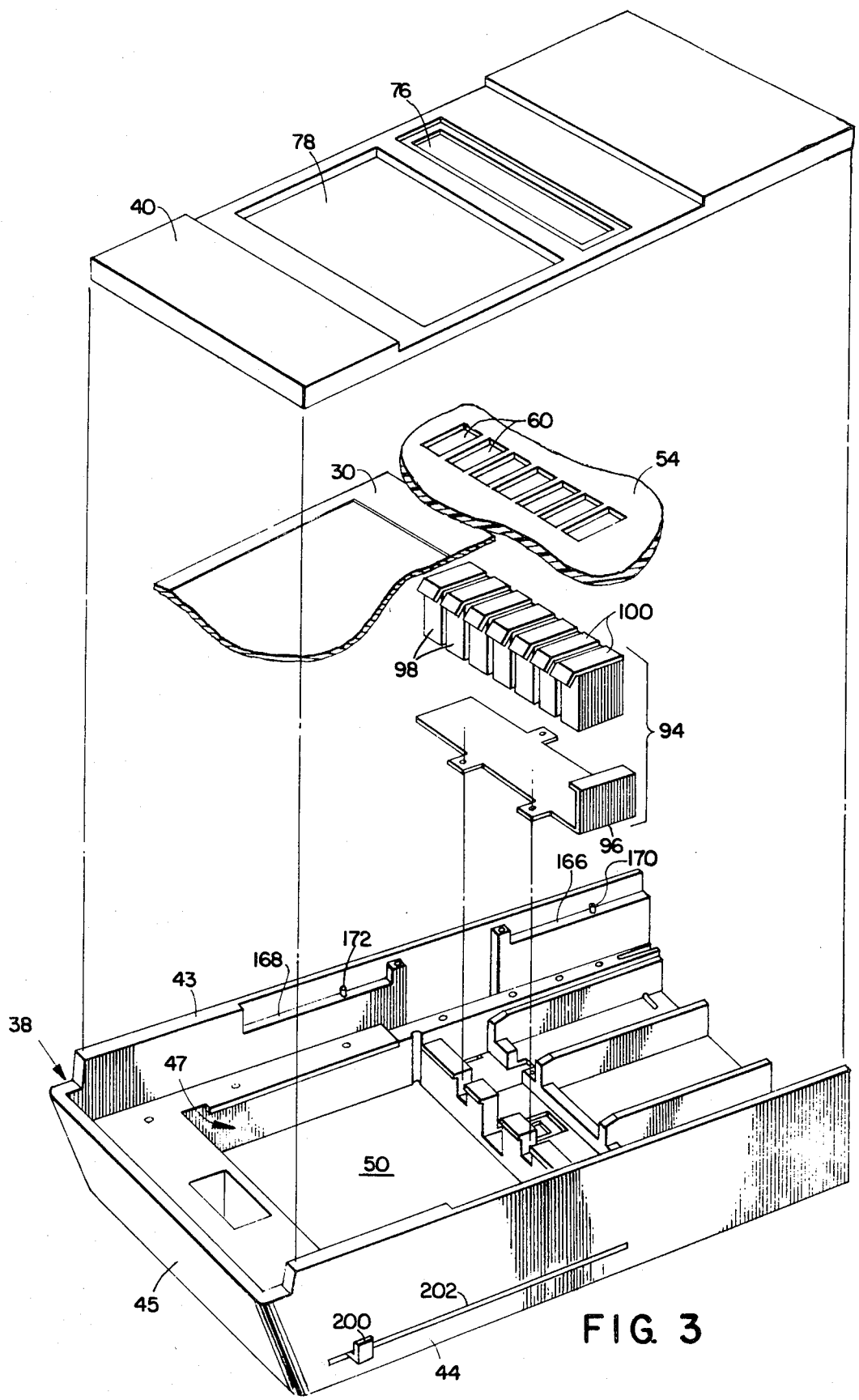
FIG. 3 is an exploded perspective view of selected camera components.
Figure 6:
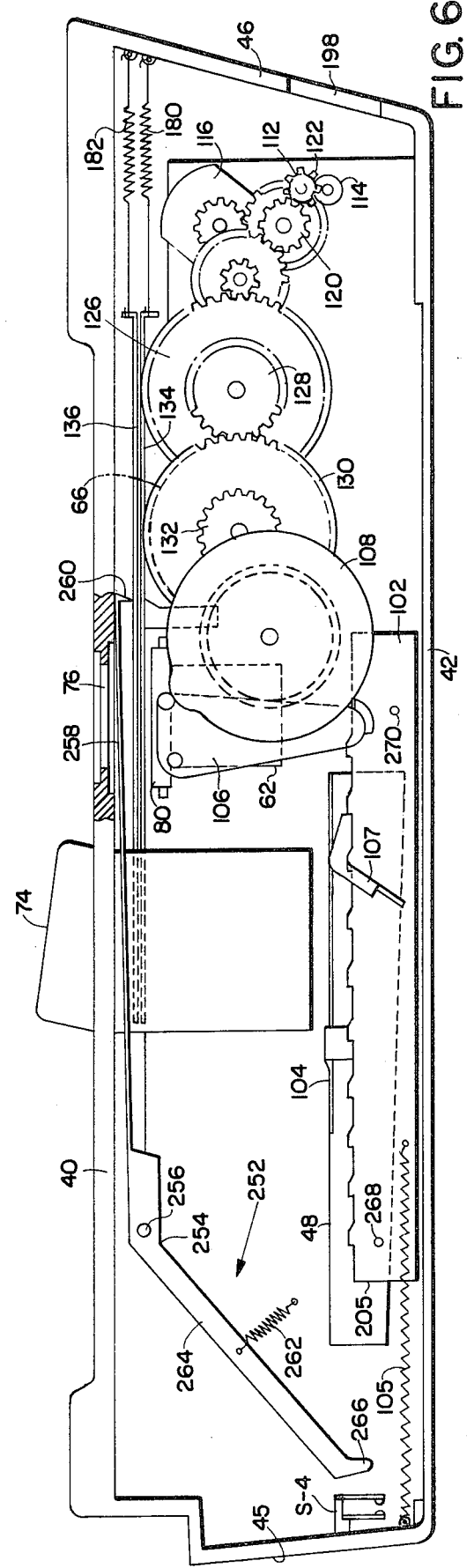
FIG. 6 is a longitudinal cross-sectional view, partly in section, of the camera embodying the present invention showing a shutter latching mechanism in its unlatching position.

As best shown in FIGS. 3 and 6, base section 38 is defined by a bottom wall 42 and a peripheral section defined by a pair of oppositely spaced side walls 43 and 44 and a pair of oppositely spaced ends walls 45 and 46. For visual clarity, end wall 46 is not shown in FIG. 3.

The base section 38 includes a generally rectangular frame 47 for replaceably receiving a film container 48 (see FIG. 6) holding a plurality of film units 30 therein in stacked relation. Access to frame 47 for loading or withdrawing a film container 48 is provided by an access door 50 in the bottom or rear wall 42 of housing section 38.

Figure 4:
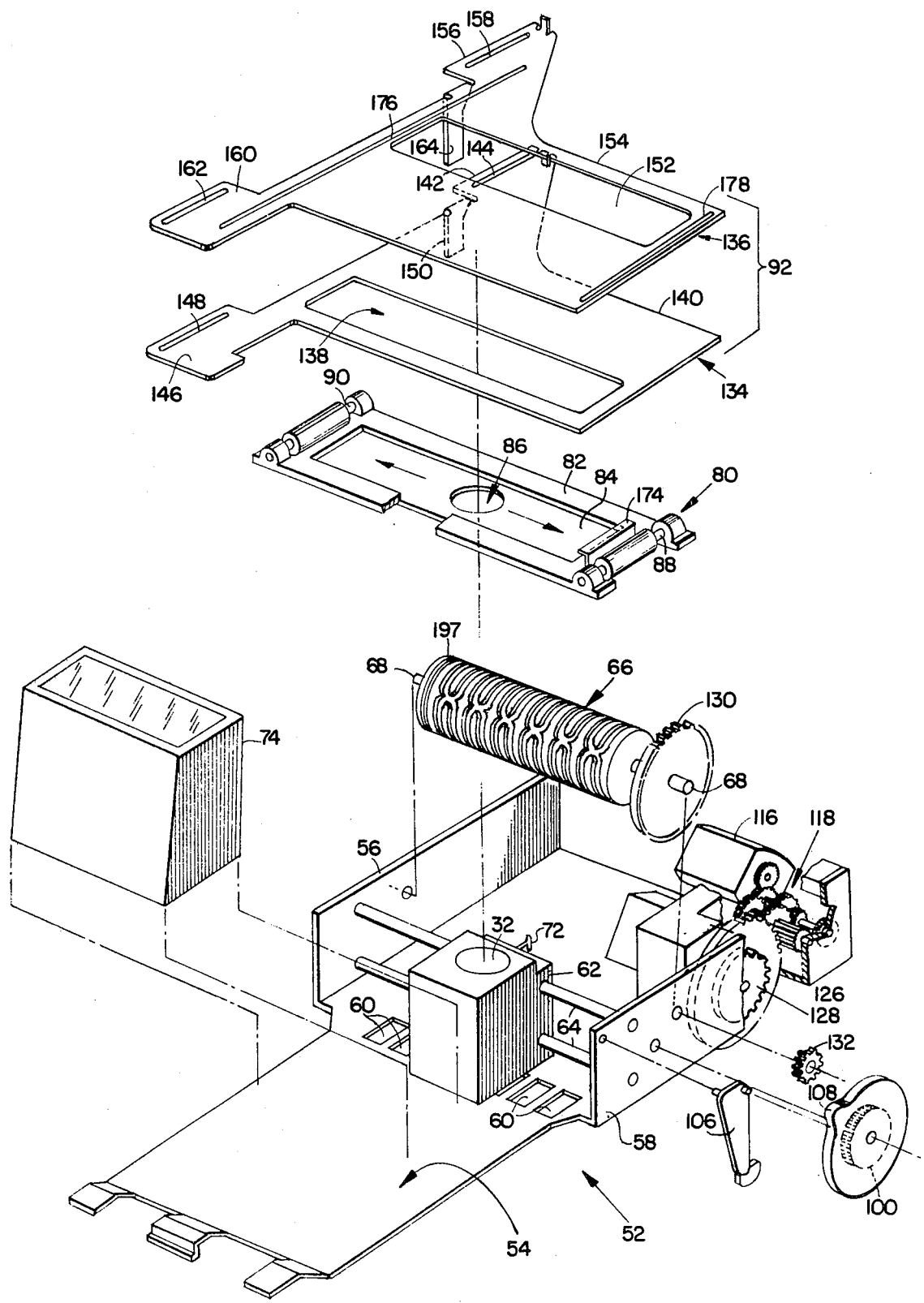
FIG. 4 is an exploded perspective view of a camera subassembly.

As best shown in FIG. 4, the major components of camera 10 are mounted on a mounting frame 52 that fits into base section 38 and is defined by a generally planar bottom wall or base plate 54 and a pair of laterally spaced upstanding side wall sections 56 and 58.

Located in base plate 54 are a plurality (7) of generally rectangular, equally spaced framing gate apertures 60 disposed in a laterally extending linear row and serving as gates, through which image forming light is transmitted, to define the image areas 28 on a portion of film unit 30 supported against the underside of plates 54 in registration with apertures 60. Thus the underside of base plate 54 in cooperation with later-to-be-described film supporting structure serves as means for defining the camera film plane 34.

The objective lens 32 is carried in a block-like lens carriage 62 that is slidably mounted on guide rods 64, extending between side walls 56 and 58, for movement along a linear path of travel over the apertures 60 which allows the lens 32 to be located at successive imaging positions in imaging relation with each of the framing gate apertures 60 in the linear row.

Camera 10 also includes means for automatically advancing the lens 32 along its path of travel in predetermined increments. These advancing means include a barrel cam 66 having the opposite ends of its fixed axial shaft 68 rotatably mounted in side walls 56 and 58 and a double helix-like cam groove 70 formed in its cylindrical exterior surface; and a cam follower 72 formed on lens carriage 62 which extends into and rides along groove 70. The manner in which the barrel cam 66 is rotatably driven to reciprocally advance the lens 32 relative to the row of framing gate apertures 60 will be discussed later herein.

Also mounted on frame 52, on the opposite side of carriage 62 from cam 66, is an electronic strobe unit 74 which is operative to illuminate a document located on mounting glass 18. As best shown in FIGS. 3, 6, and 10, the forward wall section 40 of the camera housing 36 is provided with an elongated rectangular lens aperture 76 which is aligned with the framing gate apertures 60 and the lateral path of travel thereover of lens 32; and a generally rectangular aperture 78 through which the top portion of strobe unit 74 protrudes slightly beyond the exterior face of forward wall section 40. It will be noted that the aperture 22 in the mount 16 of console 12 is sufficiently large so both the lens aperture 76 and the strobe aperture 78 are in facing relation therewith when camera 10 is operatively positioned in mount 16.

In order to limit the transmission of light passing through lens aperture 76 to a single gate 60 having lens 32 in imaging relation therewith, camera 10 is provided with a light shield or apron assembly 80 (see FIG. 4) that is secured to the opposite side walls of housing section 38, behind lens aperture 76, and extends over the path of travel of lens 32. The light shield assembly 80 includes a generally rectangular open frame 82, a flexible light opaque apron 84 positioned over the opening of frame 82 and having an opening 86 therein, and a pair of rollers 88 and 90 rotatably mounted on the opposite lateral ends of frame 82 and having the opposite ends of apron 84 secured thereto and on which the apron 84 is wound and unwound respectively thereby allowing apron 84 to move laterally across frame 82. In a preferred embodiment, the apron 84 is secured to the top surface of lens carriage 62 with its aperture 86 aligned with lens 32. In this manner, the flexible apron 84 is automatically driven along its lateral path of travel by the lens carriage 62. Image forming light transmitted through aperture 76 may pass only through aperture 86 and the aligned lens 32 so that apron 84 effectively blocks the light path to the other framing gate apertures 60 which do not have the lens 32 located in imaging relation therewith.

In addition to light shield assembly 80, the means for effecting the transmission of image forming light through lens 32 to expose an image area 28 on the film unit 30 includes a shutter 92 located over light shield 80 behind the aperture 76 (see FIG. 4).

The shutter 92 will be described in detail later on in this disclosure. Briefly, it includes opening and closing blades that are adapted to be driven by a control member associated with the barrel cam 66 between positions blocking and unblocking the exposure optical path through lens 32 to an image area 28. While the shutter 92 is open, the strobe unit 74 is fired to illuminate the document on glass 18.

As best shown in FIG. 3, the film unit 30 is supported against the underside of base plate 54 in alignment with the framing gate aperture 60 by means of a support assembly 94 comprising a base flange 96, mounted at the bottom of housing section 38, and a linear array of seven resilient blocks 98 on flange 96, each having a low friction cap 100 thereon, for resiliently urging a lateral row defining portion of film unit 30 against the underside of seven framing gate apertures 60.

After a row of image areas 28 has been exposed, the film unit 30 is advanced longitudinally one row position, to locate the next successive lateral portion of film unit 30 in alignment with the row of framing gate apertures 60. As best shown in FIGS. 3, 4, 6 and 10, the means for incrementally advancing film unit 30 in the longitudinal direction include an elongated pick slide 102, mounted on the interior side of base housing section side wall 44 for longitudinal movement, and a pick 104 mounted on the trailing end of pick slide 102 and configured to extend into a longitudinal slot in film container 48 to engage and advance the forwardmost film unit 30 therein incrementally relative to the exposure position defined by the row of framing gate apertures 60.

The pick slide 102 is biased toward housing end wall 45 by a spring 105 and is moved incrementally by the pivotal motion of a pick drive lever 106 that is pivotally mounted thereover on side wall 58 with its articulated bottom portion in engagement with a top ratchet section of pick slide 102. A pawl 107 acts as a brake for releasably holding pick slide 102 at each step position against the bias of spring 105. The pick lever 106 is in turn operated by a pick drive cam 108. Cam 108 has a smaller diameter gear 110 on its interior side which is rotatably mounted on side wall 58.

Pick drive cam 108, the barrel cam 66 and a pair of pressure applying rollers 112 and 114, extending between and being rotatably mounted on the opposed side walls 56 and 58 adjacent end wall 46, are adapted to be rotatably driven by a small high speed electrical motor 116 through a speed reduction gear train 118 coupled to the output shaft of motor 116.

One power transmission path of gear train 118 terminates in a roller drive gear 120 that is in mesh with a gear 122 on the end of upper roller 112.

A second power transmission path of gear train 118 terminates a timing gear 126 having an integrally formed smaller diameter barrel cam drive gear 128 on its exterior side. The gears in between motor 116 and the timing gear, defined by gears 126 and 128, are arranged so that the timing gear rotates through a single full revolution for each cycle of camera operation.

The barrel cam drive gear 128 is in mesh with a larger diameter barrel cam gear 130 fixedly secured to the barrel cam shaft 68 adjacent the interior of side wall 58. The diameter of gear 130 is twice the diameter of barrel cam drive gear 128 so that the barrel cam 66 is rotatably driven through half a revolution (180°) for each full revolution of the timing gear set defined by gears 126 and 128. That is, during each cycle of operation the barrel cam 66 rotates through 180° to operate the shutter 92 and locate the lens carriage 62 and the objective lens 32 therein at its next imaging position for the exposure of the next adjacent image area 28.

Secured to the outboard end of barrel cam shaft 68, on the exterior side of side wall 58, is a small diameter pick cam drive gear 132 that is in mesh with the gear 110 on the pick drive cam 108.

The ratio of the gears 132 and 110 is selected such that the pick drive cam 108 makes a single revolution for each seven cycles of camera operation. That is, the cam 108 only pivots pick drive lever 106 after each linear pass of the lens 32 along the row of framing gate apertures 60 so that after the last exposure in the row, cam 108 and pick lever 106 cooperate to advance the pick slide 102 one row position towards leading end wall 46 to locate the next row defining lateral portion of the film unit 30 in alignment with the framing gate apertures 60.

The shutter 92 will be described now with reference to FIGS. 4, 7, 8 and 11. Shutter 92 comprises a lower opening shutter blade 134 and a superposed upper closing blade 136 movable relative to one another, in the longitudinal direction, for selectively blocking and unblocking the transmission of image forming light along an optical path passing through lens aperture 76 and the objective lens 32 to effect exposure of an image area 28 at the film plane 34.

The illustrated blades 134 and 136 are thin sheet metal piece parts formed of any suitable material such as aluminum or stainless steel.

The opening blade 134 includes an elongated rectangular laterally extending opening blade aperture 138 formed in the rear portion of its main body section 140. Integrally formed with the left side of body section 140 is a forward mounting arm section 142 having a longitudinal guide slot 144 therein and a rear mounting arm section 146 having a guide slot 148 therein. Positioned just behind forward arm section 142 is an integrally formed depending opening blade leg or tab 150.

The closing blade 136 includes a similar aperture 152 in the forward portion of its main body section 154; a forward mounting arm section 156 having a guide slot 158 therein; a rear mounting arm section 160 having a guide slot 162 therein; and a depending leg or tab 164 which is longer than the corresponding tab 150 on blade 134.

The shutter 92 is adapted to be located between the interior surface of forward camera housing wall 40 and the apron assembly 80 as best shown in FIG. 6. The forward and rear arm sections 142 and 146 of opening blade 134 rest on forward and rear horizontal support shelves 166 and 168 formed on the interior of housing side wall 43 (see FIG. 3). Upstanding guide pins 170 and 172 provided on shelves 166 and 168 extend up through guide slots 144 and 148 respectively to guide longitudinal sliding movement of blade 134. The right edge of opening blade body section 140 is supported for sliding movement by a blade support member 174 formed on the upward facing side of apron assembly 80.

The closing blade 136 rest on top of opening blade 134 with the guide pins 170 and 172 extending upwardly through its guide slots 158 and 162 and the right lateral edge of body section 154 captured in the blade support member 174 on apron assembly 80. In a preferred embodiment, closing blade 136 is provided with longitudinally extending depending ribs 176 and 178 along its lateral edges to minimize contact between the upper and lower blades and thereby reduce sliding friction.

Figure 7:
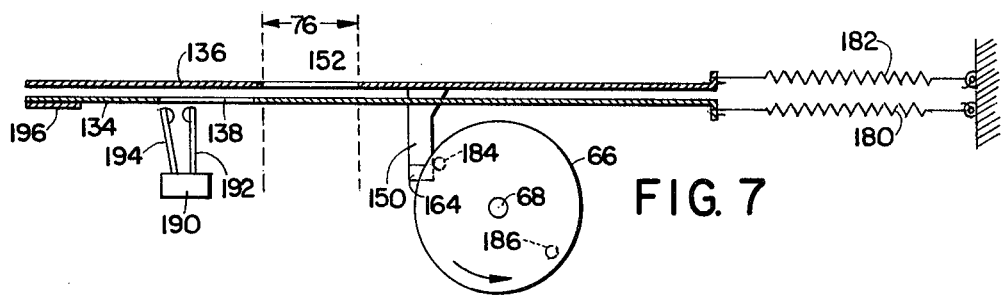
FIG. 7 is a diagrammatic view of the camera shutter and shutter control mechanism shown in the cocked position.
Figure 8:
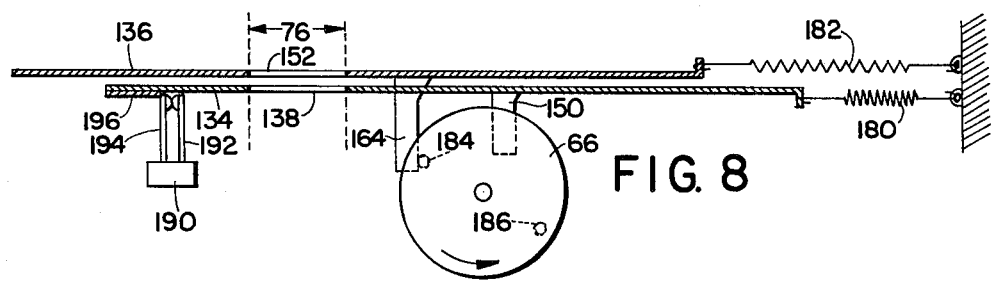
FIG. 8 is similar in some respects to FIG. 7 but shows the shutter and control mechanism following movement of the opening blade.

When the shutter blades 134 and 136 are assembled, they are independently biased forwardly towards end wall 46 by blade bias springs 180 and 182 respectively and their depending tabs 150 and 164 extend downwardly beside the left end (as viewed in FIG. 4) of the barrel cam 66 so that the forwardly facing vertical edges of tabs 150 and 164 are in position to be engaged by a pair of diametrically opposed shutter actuator pins 184 and 186 thereon extending outwardly towards side wall 43 as best shown in FIGS. 7 and 8.

FIG. 7 shows the opening and closing blades 134 and 136 in their normally closed cocked position when the barrel cam 66 is at rest. The two vertical dotted lines indicate the location of exposure aperture 76 and the row of aperture gates 60 aligned directly therebelow. The blades 134 and 136 are held in the rearward cocked position by the engagement of actuator pin 184 with the leading edges of both the short opening blade tab 150 and the longer closing blade tab 164. When so located, the aperture 152 of closing blade 136 is in registration with aperture 76 but the aperture 138 of opening blade 134 is located rearwardly thereof and is out of registration with apertures 152 and 76. Thus the forward portion of opening blade body 140 blocks transmission of image forming light through aperture 76 to the lens 32.

FIGS. 7 and 8 also show a normally open electrical switch 190 having upstanding spaced contact arms 192 and 194 positioned below the trailing end of opening blade 134 with arm 194 facing an underturned flange 196 thereon. Upon closure, switch 190 is operative to effect firing of the strobe unit 74.

As noted earlier, the barrel cam 66 is configured to effect an exposure cycle during which shutter 92 and strobe unit 74 operate and the lens carriage is incrementally moved, if necessary, to its next imaging position in response to rotation of cam 66 through one rotational increment of 180°. The cam groove 70 is configured so that there is a relatively long dwell section at the beginning of each rotational increment during which the shutter and strobe unit operate and a relatively short rise section at the end of the increment during which the lens carriage 62 is moved. However, at each end of the groove 70 there is one 180° cam segment 197 that is entirely a dwell section so that the carriage is not indexed after the last exposure in the row. That is, the carriage 62 remains in the last exposure position so that it is automatically in position for exposure of the first image area in the next row following incremental advance of the film unit 30 by the pick 104.

At the beginning of a typical exposure cycle, the motor 116 is energized by a later-to-be-described motor control system and barrel cam 66 is rotatably driven in a counterclockwise direction from the position shown in FIG. 7. In response to such rotation the actuator pin 184 that is releasably holding the blades 134 and 136 in the cocked position first slides off the shorter tab 150 on opening blade 134 thereby releasing blade 134 for movement to the right under the influence of spring 180 as shown in FIG. 8 to the unblocking position where its aperture 138 is in registration with aperture 152 of closing blade 136. In response to such movement flange 196 on blade 134 engages switch arm 194 and moves it into contact with arm 192 to close switch 190 and fire the strobe unit 74.

In response to further counterclockwise rotation of cam 66, the pin 184 slides off the longer tab 164 and releases closing blade 136 for movement to the right by spring 182 to the blocking position wherein the blade apertures are out of registration and the light path through exposure aperture 76 is blocked by the rearward portion of closing blade body 154.

Toward the end of the 180° rotational increment, when the lens carriage is moved, the second actuator pin 186 will engage tabs 150 and 164 and drive blades 134 and 136 to the left back to the cocked position of FIG. 7 whereupon the motor is deenergized and the cam 66 comes to rest at the end of the rotational increment.

Following exposure of last image area 28 on the film unit 30, camera 10 operates in a processing cycle mode wherein the pick slide member 102 is advanced to feed the leading end of film unit 30 into the bite of pressure applying rollers 112 and 114 which are rotatably driven by motor 116 through gear train 118. The rollers apply a compressive pressure to the film unit 30 as it is advanced therebetween for rupturing a pod at the leading end of the film unit to discharge a supply of fluid processing composition therefrom and for distributing the fluid in a thin layer between predetermined layers of the film unit to initiate a well-known development and diffusion transfer process. The processed film unit 30 is advanced from the rollers 112 and 114 and exits the camera housing through a film exit slot 198 in leading end wall 46.

In a normal sequence of camera operation the pick slide member 102 is located at an initial rearwardmost position shown in FIG. 10 where its trailing end 205 is adjacent housing wall 45 and pick 104 is at the rear end of film container 48 in position to engage the trailing edge of the forwardmost film unit 30. Using a pick slide handle 200 which is attached to pick slide member 102 and extends out through a longitudinal slot 202 in housing side wall 44 (see FIG. 3), the operator manually advances pick slide member 102 forwardly to move the leading end of the film unit 30 through a film withdrawal slot at the leading end of container 48 so as to position the first laterally extending portion of the film in registration with the image area defining gate apertures 60.

Now camera 10 is set to operate in the exposure cycle mode. In response to each manual actuation of an actuator button 204 on rear wall 42 (see FIG. 1) an electrical switch in a later-to-be-described motor control system is closed and the motor 116 is energized to drive the barrel cam 66 through one rotational increment or half revolution whereupon motor 116 is automatically deenergized. In response to rotation of barrel cam 66, first the shutter 92 and strope unit 74 operate as described to effect exposure of an image area 28 and then the lens carriage 62 is moved laterally to locate lens 32 in imaging relation with the next image area. After the last exposure, actuator 204 is manually operated once again to initiate the previously described processing cycle. The barrel cam 66 also rotates through a half revolution during the processing cycle which automatically locates the lens 32 and the cam 66 at a starting position in preparation for exposing the next film unit.

As noted earlier, the cam groove 70 is configured at both ends to include one semi-cylindrical segment 197 which is entirely a dwell section so that carriage 62 doesn't move in response a half revolution of cam 66 and the other semi-cylindrical section that includes both a dwell section and a rise section for operating the shutter and strobe and then indexing the lens. The term starting position of the lens 32 and cam 66 refers not only to locating the lens 32 at the first column (left side as viewed in FIG. 5) exposure position, but also locating the barrel cam 66 at the beginning of the correct semi-cylindrical segment to effect both exposure and lens indexing. If the cam 66 is initially positioned at the full dwell section 197, lens 32 will not move after exposure of the first image area 28 but the pick 102 will advance the film unit to position the next row of image areas 28 under the gate apertures 60.

In some instances it will be desirable to process the film unit 30 before all of the image areas 28 have been exposed. This is accomplished by manually advancing the pick slide member 102 with handle 200 to its forwardmost or terminal position to initiate the processing cycle. If this is done, it is most likely that the lens 32 and barrel cam 66 will not be located at the starting position. Therefore, the motor control system, to be described next, is configured to operate in a reset cycle mode wherein the motor 116 is energized to continuously drive the barrel cam 66 through as many rotational increments (half revolutions) as necessary to return the lens 32 and cam 66 to the starting position.

A motor control circuit 206 forming part of the motor control system embodying the present invention is shown in FIG. 15. Circuit 206 comprises three normally open electrical switches designated S-1, S-2 and S-3 connected in parallel between a source of electrical power, such as battery B or any other suitable source, and motor 116; and an additional parallel connected switching arrangement consisting of a normally open switch S-4 connected in series with a normally closed switch S-5.

The S-1 switch is adapted to be closed by the manual depression of actuator button 204 for initially energizing motor 116 to being an exposure cycle. The motor 116 rotatably drives the barrel cam 66 through the gear train 118 formed in part by the timing gear 126 having drive gear 128 thereon.

As noted earlier, gear 126 is adapted to rotate through a full (360°) revolution during each cycle wherein cam 66 is advanced through one rotational increment of 180°. Thus the angular disposition of gear 126 serves as a very accurate means for ascertaining the angular displacement of barrel cam 66 with respect to the limits of the semi-cylindrical cam segments. However, because gear 126 makes two revolutions for each full revolution of cam 66, it does not provide an indication of which one of the two semi-cylindrical segments is in operative relation with the lens carriage cam follower 72.

As will become apparent latter, in response to initial rotation of gear 126 by the closing of S-1, a cam on gear 126 will close S-2 thereby maintaining the motor 116 in its energized state upon the manual release of actuator 204 which will cause S-1 to open. As gear 126 approaches the end of its single revolution, the cam on gear 126 will open S-2 to automatically deenergize motor 116 so that the barrel cam is advanced through is rotational increment of 180°. In a preferred embodiment, switch S-1 is of the type that makes momentary contact when closed and then reopens when control of motor 116 has been transferred to S-2 so that S-2 may automatically deenergize motor 116 should the user inadvertently depress actuator 204 for a time period that is longer than necessary to advance barrel cam 66 through its rotational increment.

Switch S-3 is closed in response to the film unit 30 being advanced toward the bite of rollers 112 and 114 for energizing motor 116 to process film unit 30. Generally the motor is energized for a time period that coincides with the time required to advance the barrel cam 66 through one rotational increment. However, during film processing gear 126 rotates along with cam 66 and the cam on gear 126 operates S-2 as noted above. In a preferred embodiment, the rollers 112 and 114 are configured so that film unit 30 passes therebetween during a time that is a little shorter than the period of rotation of gear 126 so that S-2 opens to deenergize the motor 116 at the end of the processing cycle. As will be apparent later, S-3 is engaged and closed by the film unit 30 and is automatically reopened when film unit 30 becomes disengaged therefrom.

S-4 is configured to be closed in response to locating pick slide member 102 in its initial or rearwardmost position for energizing motor 116 to initiate a reset cycle. In combination with the normally closed switch S-5, the closure of S-4 maintains the motor 116 in its energized state and overrides the operation of S-2 effected by the cam on gear 126 during each half revolution of cam 66 to prevent automatic deenergization by S-2. The motor 116 drives cam 66 through as many rotational increments as necessary to return lens 32 and cam 66 to the starting position. During the last necessary rotational increment switch S-5 is automatically opened thereby transferring control back to S-2 which automatically opens at the end of the last rotational increment.

Structurally the S-2, S-3 and S-5 switches are included as a switching assembly 208 shown in FIGS. 9-14. The S-1 switch may be of the type that is combined in an assembly with actuator button 204 shown mounted on camera housing rear wall 42 in FIG. 1. The S-4 switch is shown in FIGS. 6 and 10 mounted on the interior of housing end wall 45 in alignment with the trailing end 205 of pick slide member 102.

Figure 9:
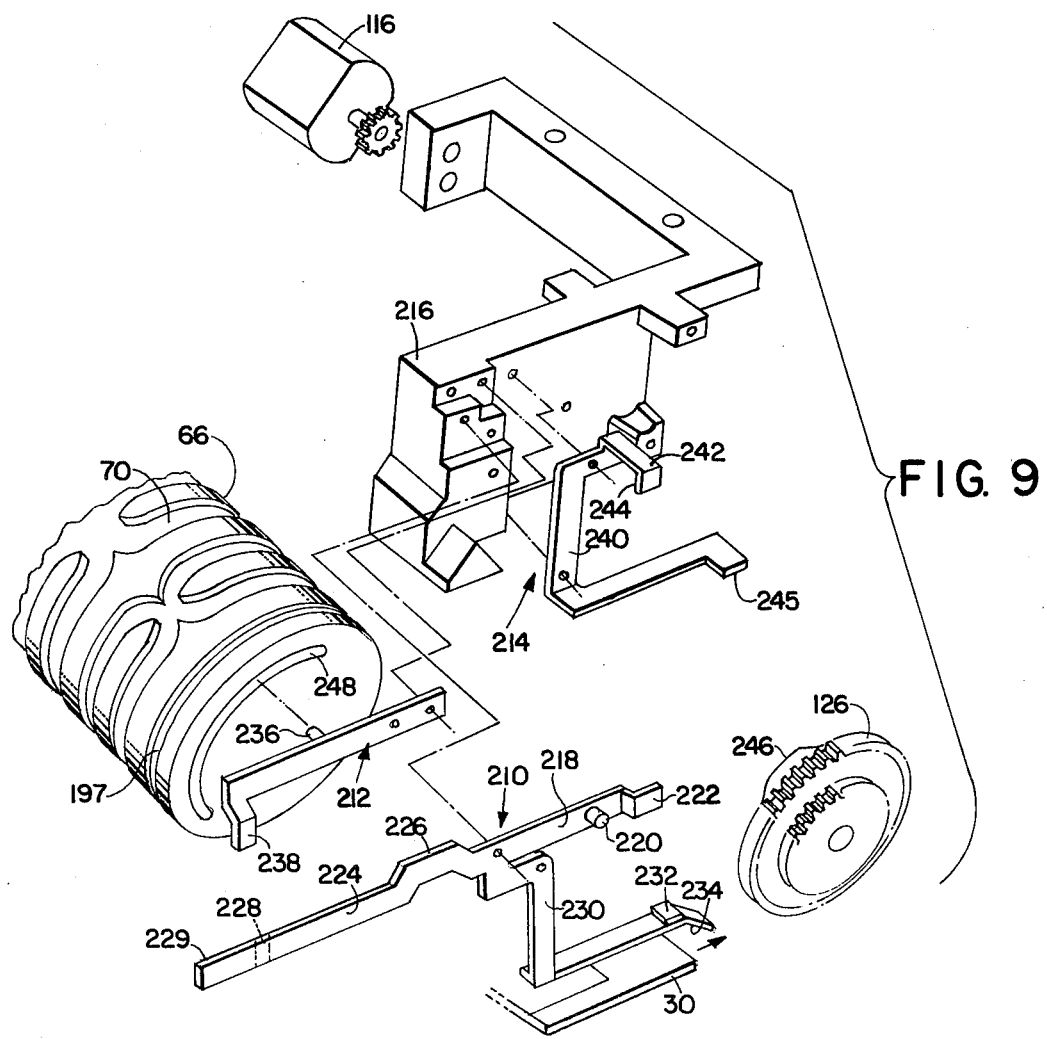
FIG. 9 is an exploded perspective view showing components of a motor control system switching assembly.

With reference to FIG. 9 switch assembly 208 comprises conductive (copper) switch contact members 210, 212 and 214 adapted to be fixedly secured to a mounting block 216, formed of an electrically insulating material which also mounts various components of the drive system including motor 116 and timing gear 126.

Contact member 210 combines common poles of the S-2, S-3 and S-5 switches into a single piece part to reduce fabrication and assembly costs. The structure of member 210 includes a forwardly extending upper contact arm 218 having a cam follower pin 220 thereon and terminating at its free end in an outwardly offset contact 222 of the S-2 switch; a rearwardly extending upper contact arm 224 having an offset portion 226 to provide clearance for barrel cam shaft 68 and a contact 228 of the S-5 switch located forwardly of its free end 229; and a depending L-shaped forwardly extending contact arm 230 having a contact 232 of the S-3 switch near its free end and terminating in a downwardly turned inclined ramp section 234 that will be engaged by film unit 30 to raise contact 232 into engagement with the second contact of the S-3 switch.

Contact arm 212 extends rearwardly and includes an inwardly facing cam follower pin 236 and terminates in an outwardly offset second contact 238 of the S-5 switch.

Contact arm 214 combines common poles of the S-2 and S-3 switches and includes an upper L-shaped arm 240 having an outwardly extending bridge section 242 at its upper end for extending across arm 218 and positioning a depending second contact 244 of the S-2 switch in facing relation to contact 222 on arm 218; and a lower horizontal arm section terminating in a second contact 245 of the S-3 switch.

The contact arms 210, 212 and 214 are securely fastened to the insulating mounting block 216, in the positions indicated by the broken assembly lines, by any suitable fasteners (not shown) such as screws, rivets, etc.

As best shown in FIGS. 10 and 11, mounting block 216 positions the switching assembly 208 between the righthand end of the barrel cam 66 and the interior face of timing gear 126. In FIG. 11, the S-2 switch is shown in its closed position with contact 222 on arm 218 in engagement with contact 244 on bridge section 242.

However, the interior surface of gear 126 is configured as a switch actuating cam which includes an inwardly extending raised cam face section 246. When barrel cam 66 is at rest at either one of its two operative positions, cam section 246 is positioned in facing engagement with follower pin 220 of arm 218 causing arm 218 to be resiliently deflected inwardly thereby moving contact 222 out of engagement with contact 244 and opening the S-2 switch. Thus the S-2 switch is normally held in its open position by cam section 246.

In response to energization of motor 116, gear 126 rotates and follower pin 220 rides down off cam section 246 allowing arm 218 to move outwardly so that contact 222 engages contact 244 to close the S-2 switch. As noted earlier, gear 126 makes a full revolution for every half revolution of barrel cam 62. As the cam 66 approaches the end of its rotational increment, pin 220 rides up onto cam section 246 to open the S-2 switch thereby automatically deenergizing motor 116.

As best shown in FIG. 10, the S-3 switch contacts are positioned just above the path of travel of film unit 30 into the bite of rollers 112 and 114 with the ramp section 234 of arm 230 projecting downwardly into the film path. As the pick member 102 advances the film unit 30 toward the rollers, the leading end of the film unit 30 engages ramp section 234 causing the lower horizontal portion of arm 230 to resiliently deflect upwardly so that contact 232 engages the overlying contact 245 to close S-3. The S-3 switch remains closed to energize motor 116 as long as film unit 30 is engaged with ramp section 234. When film unit 30 is advanced past ramp 234, the lower horizontal section of arm 230 moves downwardly to open the S-3 switch. At this point motor control is transferred to the S-2 switch which maintains motor 116 in the energized state until the completion of the single revolution of gear 126.

As best shown in FIG. 9, the cam follower pin 236 on S-5 contact arm 212 is positioned to ride on the peripheral edge surface of the right-hand end of barrel cam 66 which includes a crescent-shaped recess 248 along that sem-cylindrical segment of barrel cam 66 having the full dwell section portion 197 of groove 70 thereon. As follower pin 236 rides on the peripheral surface opposite recess 248, contact arm 212 is resiliently deflected outwardly. However, as barrel cam 66 turns, pin 236 rides down into recess 248 allowing arm 212 to move inwardly. At the end of recess 248, pin 236 rides up onto the peripheral surface once more deflecting arm 212 outwardly.

As noted earlier, switch S-5 is normally closed and only opens when two conditions occur. First, the lens 32 must be at the starting position for exposing an image area 28 in the first column. Also, the barrel cam must be in a predetermined angular disposition so that the follower pin 72 of lens carriage 62 is positioned at the beginning of barrel cam groove section opposite dwell section 197.

As best shown in FIG. 12, the end portion 229 of arm 224 projects rearwardly beyond barrel cam 66 into the path of travel of lens carriage 62. When carriage 62 is not at the starting position (all the way to the right as shown in FIGS. 13 and 14), arm 224 is biased inwardly so that a contact 228 remains in engagement with contact 238 on arm 212 regardless of the angular disposition of barrel cam 66. However, when carriage 62 is driven to the starting position it engages end 229 and deflects arm 224 outwardly. If cam follower pin 236 is on the peripheral surface, arm 212 is also deflected outwardly as shown in FIG. 13 so that contact 238 remains in engagement with contact 228 to maintain switch S-5 in its normally closed state. But when barrel cam 66 rotates to the point where pin 236 slides into recess 248, arm 212 resiliently moves inwardly causing the S-5 switch to open as shown in FIG. 14.

As noted earlier, the shutter 92 is normally operated in response to rotation of barrel cam 62 when one of the two actuator pins 184 or 186 sequentially slides off the blade tabs 150 and 164. However, it is preferable that the shutter 92 not operate during a reset cycle to prevent wear and tear of the shutter mechanism and also to inhibit energy consuming operation of the strobe unit 74. Therefore, camera 10 preferably also includes means, including a shutter latching device 252 shown in FIGS. 6, 10 and 11, for disenabling shutter operation during reset cycle mode operation and for enabling shutter operation during exposure cycle mode operation.

Latching device 252 includes a latching lever 254 mounted for pivotal movement about pivot pin 256 on the interior of housing side wall 44 behind strobe unit 74 between the blade latching position of FIGS. 10 and 11 and the blade unlatching position of FIG. 6. Incorporated in lever 254 is a thin elongated forwardly extending latch member 258 which terminates in a latch hook 260 for engaging the leading edges of the cocked shutter blade body sections 140 and 154 when lever 254 is in the latching position. The lever 254 is biased towards the unlatching position by a spring 262 having one end secured to side wall 44 and its opposite end secured to a rearwardly extending downwardly inclined lever section 264 which terminates in a trailing end portion 266 positioned to be engaged by the trail end 205 of pick slide member 102 when member 102 approaches its rearwardmost initial position.

As best shown in FIG. 6, when pick slide member 102 is in any of its step positions other than the initial position, spring 262 causes lever 254 to be rotated in a counterclockwise direction about pin 256 to the unlatching position where latch hook 260 is above and free of the leading edges of the opening and closing blades 134 and 136 thereby enabling shutter operation in response to rotation of barrel cam 66.

However, when pick slide member 102 is moved rearwardly to its initial position, trailing end 205 engages lever end 266 and causes lever 254 to pivot in a clockwise direction to the latching position shown in FIGS. 10 and 11. Thus the latch hook 260 engages the leading edges of blades 134 and 136 and prevents their movement by the biasing springs 180 and 182 when the actuator pins slide off the blade tabs 150 and 164 in response to barrel cam rotation. The latching action of lever 254 is completed just before the trailing end 205 of pick slide member 102 closes the S-4 switch to initiate a reset cycle. When pick slide member 102 is moved forwardly manually to advance the next film unit 30 to the exposure position, the trailing end 205 of members 102 becomes disengaged from lever end 266 and lever 254 automatically pivots to the unlatching position to enable shutter operation.

When operation of shutter 92 is disenabled, operation of the strobe unit 74 is automatically disenabled in that opening blade 134 is restrained from advancing from the cocked position to close strobe firing switch 190.

The operation of camera 10 will now be described. It will be assumed that a reset cycle has just been completed and the camera components are in the positions shown in FIG. 10. That is, the pick slide member 102 is in its rearwardmost position so that latch lever 254 is in its latching position for disenabling operation of shutter 92 and the S-4 switch is closed by the trailing end 205 of slide member 102. Because the lens 30 and barrel cam 66 are in the starting position, the normally closed S-5 switch is open. At this point, the S-1, S-2 and S-3 switches are in their normal open position.

The operator manually advances slide member 102 forwardly to advance the forwardmost film unit 30 forwardly to locate the first lateral row portion thereon in alignment with the framing gate apertures 60. This motion of member 102 disengages its trailing end from latch lever 254 which pivots to the unlatching position under the influence of biasing spring 262. Also, the trailing end 205 becomes disengaged from switch S-4 causing it to open and the leading end of slide member 102 becomes engaged with the lower end of the pick drive lever 106. Camera 10 is now ready to operate in an exposure mode for exposing the first image area 28 on the film unit 30.

To initiate an exposure cycle, the operator manually depresses switch actuator 204 causing the S-1 switch to close. Motor 116 is energized and begins to drive the barrel cam 66 through the gear train 118. In response to initial rotation of timing gear 126, the S-2 switch is closed in response to cam follower pin 220 sliding off cam section 246. The barrel cam 66 rotates through its initial dwell section causing the shutter 92 and strobe unit 74 to operate as previously described to effect exposure of the first image area 28. Toward the end of this first half revolution of barrel cam 66 the shutter blades 134 and 136 are reset to the cocked position and the lens carriage 62 is moved laterally to locate it in imaging relation with the second image area 28 in the first row. The movement of carriage 62 and rotation of cam 66 cause the S-5 switch to close. As timing gear 126 approaches the end of its full revolution, cam section 246 causes the S-2 switch to open thereby deenergizing motor 116 so that cam 66 stops at the end of its first rotational increment. The seven image areas 28 in the first row are exposed in response to seven successive exposure cycles. At the end of the seventh exposure cycle, pick cam 108 has revolved to a full revolution and actuates pick advancing lever 106 which moves the pick slide member 102 forwardly one row position to present the next row defining area of the film unit 30 in registration with the framing gate apertures 60.

Also, at the end of the seventh exposure cycle, the cam follower pin 72 of lens carriage 62 is located in a full dwell section 197 at the end of barrel cam 66 so that it remains in the last column position for exposing that image frame area 28 in the second row.

In response to successive exposure cycles, the lens 32 makes successive passes in opposite directions and the film advance system incrementally advances the film unit longitudinally to expose all of the image areas 28 on film unit 30 in the sequence shown in FIG. 5. After the last exposure, the operator initiates an additional cycle by once again depressing actuator 204. This causes the pick slide member 102 to advance forwardly another step position to move the exposed film unit into the bite of the rollers 112 and 114. As film unit 30 approaches the rollers, it engages the ramp section 234 on the S-3 switch deflecting the lower contact 232 upwardly into engagement with contact 245 thereby energizing motor 216 for operation during the previously described film processing cycle.

As pick slide member 102 approaches its forwardmost or terminal position and actuating pin 268 near the trailing end thereof engages the lower end of brake pawl 107 and causes it to pivot in a counterclockwise direction to an unlatching position. Once release, slide member 102 is automatically driven back to its initial position by pick return spring 105. This action resets the blade latching lever 254 to its latching position and causes the S-4 switch to be closed. Also, pawl 107 is reset by an actuator pin 270 near the forward end of pick slide member 102. Because the lens 32 and the barrel cam 66 are located in the starting position automatically in response to the last actuation of camera 10 to process the film unit, the S-5 switch is open. Therefore, the closing of the S-4 switch in response to returning slide member 102 to the rearwardmost initial position does not cause the control system to initiate a reset cycle.

Now it will be assumed that the camera has been operated to expose some, but not all, of the image areas 28 on film unit 30 and the operator decides to process the film unit by manually advancing the slide member 102 to the forwardmost terminal position causing the film unit to close the S-3 switch to initiate the film processing cycle. In most instances, the lens 32 and the barrel cam 66 will not be at the starting position so that the S-5 switch will be in its normally closed position. When the pick slide member 102 is returned to its initial position, the shutter 92 is disenabled by the latching action of lever 254 and the S-4 switch is closed.

This causes a reset cycle to be initiated whereby the motor 116 is energized to drive the barrel cam 66 through as many rotational increments as is necessary to return the lens 32 and barrel cam 66 to the starting position. As noted earlier, even though the rotation of the timing gear 126 causes the S-2 switch to close and open during each half revolution of the barrel cam 66, the combination of the closed S-4 and S-5 switches bypasses any control that the S-2 switch has over motor 116. As the lens carriage 62 is advanced by the barrel cam into the first column position, the carriage engages at end 229 of switch contact arm 224 and deflects it outwardly as shown in FIG. 13. As the cam 66 turns through that segment having the full dwell section 197 thereon, the pin 236 slides down into crescent-shaped recess 248 on barrel cam 66 causing the S-5 switch to open as the cam begins to rotate through the last rotational increment. At this point, control of motor 116 is transferred to the S-2 switch which became closed at the beginning of the last rotational increment. As cam 66 approaches the end of the last rotational increment, the cam section 246 on gear 126 opens the S-2 switch to automatically deenergize motor 116 and thereby stop cam 66 at its starting position. During the entire reset cycle, the pick slide member 102 remains in its initial position so that latch lever 254 is maintained in its latching position to disenable operation of shutter 92. Because shutter 92 is unable to operate, the flash unit 74 is not fired during the reset cycle.

This invention may be practiced or embodied in still other ways without departing from the spirit or essential character thereof. The preferred embodiment described and shown herein is therefore illustrative and not restrictive, the scope of the invention being indicated by the appended claims and all variations which come within the meaning of the claim are intended to be embraced therein.

What is claimed is:

1. A camera for exposing a plurality of image areas on a single card-like film unit, said camera comprising:
   means for supporting such a film unit at a film plane for longitudinal movement;
   means for defining a laterally extending row of a plurality of image areas on a portion of the film unit supported at said film plane;
   an image forming lens;
   a carriage supporting said lens for incremental movement in linear passes along said row during which said lens is successively located in imaging relation with each of said image areas;
   a barrel cam advanceable in predetermined rotational increments for incrementally moving said lens, said barrel cam being configured to move said lens in one direction from a starting position to a terminal position during one linear pass and to move said lens in the opposite direction back to said starting position during the next linear pass;
   exposure means, including a shutter, operable for controlling the passage of image forming light through said lens to a corresponding one of said image areas;
   means on said barrel cam for normally operating said shutter each time said barrel cam is advanced through one of said rotational increments;
   film advancing means for incrementally advancing the film unit longitudinally after each linear pass to present the next portion of the film unit in registration with said image area defining means;
   means, including an energizable electrical motor, for rotatably driving said barrel cam;
   means for controlling operation of said motor, said motor control means being operable in an exposure cycle mode to effect advancement of said barrel cam through one rotational increment, and in a reset cycle mode to continuously advance said barrel to return said lens to said starting position; and
   means for disenabling operation of said shutter by said shutter operating means on said barrel cam during each reset cycle and for enabling such shutter operation during each exposure cycle.

2. The camera of claim 1 wherein said shutter includes a pair of shutter blades biased for movement from respective initial positions to respective terminal positions, said shutter operating means on said barrel cam incudes means for holding said blades in said initial positions preceding advancement of said barrel cam and for releasing said blades for movement to said terminal positions during advancement of said barrel cam through said rotational increment, and said shutter disenabling and enabling means includes blade latching means for releasably latching said blades in said initial positions during each reset cycle and for unlatching said blades during exposure cycles.

3. The camera of claim 2 wherein said film advancing means includes a pick member movable in incremental steps between an initial position and a terminal position for incrementally advancing the film unit, and said blade latching means includes a latch member mounted for movement between blade latching and unlatching positions, and means responsive to locating said pick member in its said initial position for moving said latching member to said latching position and responsive to locating said pick member at an incremental step position other than said initial position for moving said latch member to said unlatching position.

4. The camera of claim 3 wherein said control means includes means responsive to locating said pick member in its said initial position for initiating a reset cycle of operation if said lens is in a position other than said starting position.

5. The camera of claim 3 wherein said blade latching means includes a latch lever incorporating said latch member and being mounted for pivotal movement between said latching and unlatching positions, means for biasing said lever towards said unlatching position, and means on said latch lever engageable by said pick member as it approaches its said initial position for pivoting said latch lever from said unlatching to said latching position in response to locating said pick member at its said initial position.

6. The camera of claim 3 wherein said control means includes means responsive to said lens reaching said starting position during a reset cycle for indicating said barrel cam is in its last necessary revolution.

7. The camera of claim 6 wherein said indicating means includes a portion of a normally closed switch in a motor control circuit and said switch includes another portion cooperating with said barrel cam for opening said switch in response to barrel cam rotation to indicate said barrel cam is in the last necessary rotational increment of said last necessary revolution.

8. The camera of claim 1 wherein said exposure means further includes a light source for providing illumination for film exposure, said light source being operable to emit illumination in response to operation of said shutter so that disenablement of shutter operation also disenables operation of said light source to emit illumination during each reset cycle.

9. A camera for exposing a plurality of image areas on a single card-like film unit, said camera comprising:
   means for supporting such a film unit at a film plane for longitudinal movement;
   means for defining a laterally extending row of a plurality of image areas on a portion of the film unit supported at said film plane;
   an image forming lens;
   a carriage supporting said lens for incremental movement in linear passes along said row during which said lens is successively located in imaging relation with each of said image areas;
   a barrel cam advanceable in predetermined rotational increments for incrementally moving said lens, said barrel cam being configured to move said lens in one direction from a starting position to a terminal position during one linear pass and to move said lens in the opposite direction back to said starting position during the next linear pass;
   exposure means operable in response to advancement of said barrel cam for controlling passage of image forming light through said lens to a corresponding one of said image areas to effect exposure thereof;
   film advancing means for incrementally advancing the film unit longitudinally after each linear pass to present the next portion of the film unit in registration with said image area defining means;
   means, including an energizable electrical motor, for rotatably driving said barrel cam; and
   means, including a motor control circuit, for controlling operation of said motor in both an exposure cycle and reset cycle mode, said control circuit including a first switching arrangement operable for energizing said motor to effect advancement of sad barrel cam through one rotational increment and a second switching arrangement operable in the reset cycle mode for energizing said motor to continuously advance said barrel cam through as many rotational increments as necessary to return said lens to said starting position and for transferring control of said motor to said first switching arrangement as said barrel cam is advanced through the last necessary rotational increment so that said first switching arrangement automatically deenergizes said motor to terminate barrel cam advancement at the end of said last rotational increment.

10. The camera of claim 9 wherein said first and second switching arrangement are connected in parallel between a source of electrical power and said motor, said second switching arrangement includes a normally open first switch connected in series with a normally closed second switch, said first switch being configured to be closed to energize said motor and initiate a reset cycle and said second switch being configured to open in response to said lens reaching said starting position and said barrel cam reaching a predetermined angular disposition corresponding to said last rotational increment thereby transferring control of said motor to said first switching arrangement to terminate said reset cycle.

11. The camera of claim 10 wherein said second switch includes first and second contact arms which are normally positioned in engagement to close said second switch, said first arm being mounted to be engaged and deflected away from said normal position by said lens carriage when said lens is located at said starting position and said second arm being in engagement with said barrel cam and configured to extend into a recess thereon indicating said barrel cam has reached said predetermined angular disposition thereby effecting separation of said first and second arms to render said second switch open.

12. The camera of claim 10 wherein said film advancing means includes a pick member mounted for stepwise movement between an initial position and a terminal position for incrementally advancing the film unit and said pick member and said first switch are arranged so that said pick member closes said first switch when location in its said initial position and renders said first switch open when located at any step position other than said initial position.

13. The camera of claim 10 wherein said first switching arrangement includes parallel connected normally open third and fourth switches and said control means includes a manual operable actuator for closing said first switch to energize said motor and initiate an exposure cycle, and a rotating switch actuator driven by said motor through rotational increments that are proportional to said rotational increments of said barrel cam for closing said fourth switch in response to initial advancement of said barrel cam and for automatically opening said fourth switch to deenergize said motor and terminate barrel cam advancement at the end of each said barrel cam rotational increment.

14. The camera of claim 13 wherein said film unit is of the self-developing type, said camera further includes a pair of processing rollers adapted to be driven by said motor and said control circuit further includes a normally open fifth switch connected between said source of electrical power and said motor and adapted to be engaged and closed by a film unit being advanced toward said rollers for energizing said motor to initiate a film processing cycle.

* * * * *